Feb. 16, 1954     J. GILROY     2,669,415

MANUALLY OPERATED SHUTOFF VALVE

Filed Jan. 4, 1950

INVENTOR
JOHN GILROY
BY
ATTORNEYS

UNITED STATES PATENT OFFICE 2,669,415

MANUALLY OPERATED SHUTOFF VALVE

John Gilroy, Sun Prairie, Wis., assignor to Air Reduction Company, Incorporated, New York, N. Y., a corporation of New York Application January 4, 1950, Serial No. 136,764

3 Claims. (Cl. 251—45)

This invention relates to valves and more particularly to a manually operated shut-off valve for controlling the flow of a fluid, such as gas, especially at low pressures.

The principal object of the invention is to provide a manually operated shut-off valve which is extremely simple in construction and inexpensive to manufacture and which is especially adapted for easy and quick insertion in a gas pipeline such for instance as a low pressure oxygen pipeline that supplies oxygen to a respirator or breathing mask and when so inserted can be easily actuated by finger tip pressure to start or stop the flow of the oxygen or other gas.

A valve embodying the invention is illustrated in the accompanying drawing, in which.

Figure 1:
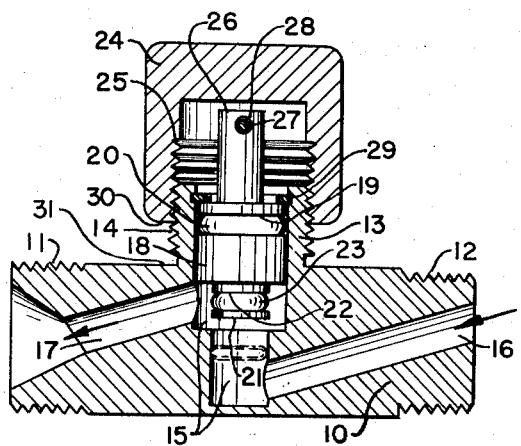
Figure 1 is a longitudinal section through the valve.

The valve comprises a one-piece body portion 10 which is preferably a simple bar of any suitable metal having its opposite ends threaded as shown at 11 and 12 and having a boss 13 intermediate its ends and projecting transversely from the bar. The boss is externally threaded as shown at 14. The body portion is drilled to provide a cavity 15 which extends axially through the boss 13 and transversely into the bar. This cavity may be of uniform diameter throughout but it preferably has the stepped shape shown in Fig. 1, the upper portion of the cavity that extends through the boss being larger in diameter than the lower portion of the cavity. The bar is also drilled longitudinally to provide a pair of gas passages 16 and 17 each of which extends from an end face of the bar to the cavity 15. The regions at which the inner ends of these gas passages communicate with the cavity 15 are in spaced relation along the length of the cavity, the passage 16 communicating with the smaller diameter portion of the cavity near the lower end thereof, and the passage 17 communicating with the larger diameter portion of the cavity. One of these passages is an inlet passage and the other is an outlet passage, the passage 16 preferably being the inlet passage and the passage 17 the outlet passage.

A cylindrical valve stem 18 is slidably guided in the larger diameter portion of the cavity 15 and is of such a diameter that it can move freely in the cavity in an axial direction. The upper portion of the valve stem is provided with an encircling groove 19 in which is positioned an O-ring 20 which cooperates with the wall of the upper portion of the cavity to provide a gastight seal around the valve stem. This O-ring therefore serves as a valve stem packing. The valve stem 18 has a portion 21 of reduced diameter projecting from its lower end and which is adapted to enter the lower smaller diameter portion of the cavity 15 when the valve stem is moved downwardly from the position shown in Fig. 1. This portion of the valve stem is also provided with an encircling groove 22 in which is positioned a second O-ring 23 having an overall diameter such that it can move laterally into the smaller diameter portion of the cavity 15 and then in cooperation with the wall of this portion of the cavity effect a gas-tight seal that prevents the flow of gas past it. The two O-rings are preferably made of a resilient elastic composition such as described in the patent to Christensen No. 2,180,795. Neoprene O-rings have been found particularly serviceable when the valve is used in an oxygen pipeline.

Figure 2:
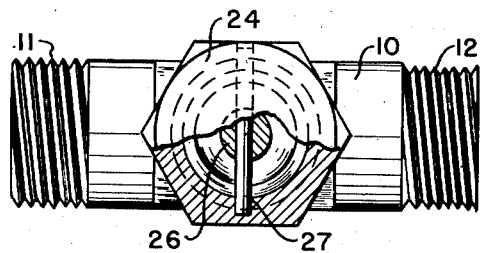
Fig. 2 is a top plan view of the valve, a portion of the actuating knob being broken away to show the manner in which it is connected to the valve stem.

A hollow knob or cap nut 24 is interiorly threaded as shown at 25 and screws on the externally threaded boss 13. The valve stem 18 has a portion 26 which extends upwardly and freely into the interior of the hollow knob. A pin 27 carried by the knob 24 passes transversely across the space within it (see also Fig. 2) and through an opening 28 in the portion 26 of the valve stem. The opening 28 is an oversize opening so that the pin 27 passes through it with a small amount of play.

It will now be seen that by screwing the knob 24 down on the boss 13 the valve stem 18 can be moved axially and downwardly to bring the O-ring 23 to the dotted line position shown in Fig. 1 in which it makes contact with the wall of the smaller diameter portion of the cavity 15 between the two regions where the inner ends of the gas passages 16 and 17 communicate with the cavity. This is the closed position of the valve in which the O-ring 23 prevents passage of gas from the inlet passage 16 to the outlet passage 17. When the knob 24 is turned in the opposite direction the valve stem 18 is moved axially upward to the full line position shown in Fig. 1. The valve stem is prevented from being retracted out of the cavity by a snap ring 29 positioned in a groove in the wall of the larger diameter portion of the cavity 15 near its upper end. The upper end of the larger diameter portion of the valve stem abuts against this snap ring when the valve is in the fully open position.

The larger diameter portion of the valve stem 18 is sufficiently long and has a sufficiently large diameter to prevent any substantial amount of tilting or cocking of the valve stem in the cavity in which it slides, thus assuring accurate guiding of the O-ring 23 and assuring its free passage into and out of the smaller diameter portion of the cavity 15. Moreover, the play provided in the connection 27—28 between the actuating knob and the valve stem prevents any jamming or binding of the parts or cocking of the O-ring 23 when the actuating knob is turned, thereby permitting the O-ring 23 to be completely self-aligning with respect to the smaller diameter portion of the cavity 15 into and out of which it moves, and also reducing wear on the parts to a minimum.

The actuating knob 24 and the threaded boss 13 are so proportioned that when the O-ring 23 has been brought to the dotted line position shown in Fig. 1 (the closed position of the valve) by screwing the knob down on the boss, the lower surface 30 of the knob comes in contact with a surface 31 on the body portion of the valve. When these surfaces are in contact forcible turning of the knob a small additional amount will lock the knob to some extent against easy manual turning in the opposite direction to open the valve. Therefore, if the knob is forcibly turned a small amount after the surfaces 30 and 31 are in contact by a tool, such as a wrench, the valve can be sufficiently locked in closed position to make manual opening of it almost impossible until the knob is again turned by the tool to loosen it, thus preventing tampering and unauthorized opening of the valve when this is desired. To facilitate the tool or wrench turning of the knob it may be given a square exterior configuration or the hexagonal exterior configuration shown in Fig. 2 to provide at least one pair of oppositely disposed flat side walls which can be gripped by the wrench or other tool. Any other suitable means to facilitate tool actuation of the knob 24 may be employed. It should be understood, however, that the forcible turning of the knob is only necessary to lock the valve in closed position to prevent tampering and that in normal operation the knob can be turned quite freely by finger tip pressure to open or close the valve. The forcible turning of the actuating knob 24 may be done without any risk of damage to the valve as the force exerted will not in any way act on the surfaces that co-act to control the flow of gas through the valve. In fact, the valve may be repeatedly locked in its closed position by forcible turning of the knob 24 when the surfaces 30 and 31 are in contact and subsequently the valve may be actuated to shut off the gas flow perfectly with mere finger tip pressure.

It will be noted that when the O-ring 23 is in the full line position shown in Fig. 1 the valve has a large flow capacity because the O-ring is then in the larger diameter portion of the cavity 15 which has a diameter greater than the diameter of the O-ring and therefore the gas can flow freely past the O-ring 23 all around its circumference from the inlet passage 16 to the outlet passage 17. Moreover, a smaller movement of the O-ring 23 from its closed to its open position is required to permit this large capacity flow than would be the case if the cavity 15 were of uniform diameter throughout and the O-ring 23 had to move completely above the entrance end of the outlet passage 17 to permit unobstructed flow of the gas from the passage 16 into the passage 17. The valve therefore has a relatively large flow capacity despite its compactness.

The valve has a number of functional, economic and manufacturing advantages over previous valves intended for similar service. The body portion may be easily and economically machined from a relatively small quantity of bar stock, it being only necessary to provide the boss on a piece of the bar stock and thread the ends of the bar and the boss and drill the several bores to form the valve and valve-stem cavity and the gas passages. The O-rings 20 and 23, snap ring 29, and pin 27 are all high production standard parts. Assembling of the parts is a simple matter and may be done rapidly. The threads at the opposite ends of the body portion enable the assembled valve to be easily and quickly inserted in a pipeline. Similar valves may be made without threaded ends for use with soldered joints or the like.

The valve has a long operating life and has been found to be extremely dependable. It is essentially a low pressure valve, having been found especially useful for line pressures up to 200 p. s. i. In laboratory tests of a number of standard valves most failed either by leakage past the valve element or by packing leakage in 3,000 to 30,000 operations. Valves of the type herein described were each operated 200,000 times without packing leakage or leakage past the valve element.

I claim:

1. A valve comprising a body portion having an externally threaded boss and having a cylindrical cavity extending axially through the boss and into the body portion, the body portion also having an inlet gas passage leading to said cavity and an outlet gas passage leading from said cavity at a region spaced along the length of the cavity from the juncture thereof with the inlet gas passage, a valve stem slidably guided in a portion of said cavity and having a packing ring cooperating with the wall thereof to produce a gas-tight seal around the valve stem, a hollow internally threaded knob having threaded engagement with said boss, a portion of the valve stem projecting into the interior of the knob, said portion of the valve stem extending only partially into the knob and having such outer dimensions relative to the interior dimensions of said knob that substantial clearance is maintained at all points between said stem and said knob, a pin carried by the knob and extending transversely across the space within it, said portion of the valve stem having a circular opening extending through it, the diameter of which is substantially greater than the diameter of the pin, said pin freely passing through said opening whereby turning of the knob on the boss moves the valve stem longitudinally in said cavity without causing it to cock and bind, and a ring of resilient material carried by the valve stem and in one position of the valve stem making contact with the wall of the cavity between the points of juncture therewith of the inlet and outlet gas passages to thereby shut off communication between said gas passages and in a different position of the valve stem placing the gas passages in communication with each other.

2. A valve comprising a body portion having an externally threaded boss projecting from it and having a cylindrical cavity extending axially through the boss into the body portion, the body portion further having gas passages leading to and from said cavity and communicating therewith at regions which are in spaced relation along the length of the cavity, a valve stem slidably guided in a portion of said cavity and having a packing ring cooperating with the wall thereof to produce a gas-tight seal around the valve stem, a ring of resilient material carried by the valve stem and in one position of the valve stem making contact with the wall of another portion of the cavity intermediate said regions at which the gas passages communicate with the cavity and thereby shutting off communication between the gas passages and in a different position of the valve stem placing the gas passages in communication with each other, an internally threaded cap nut having threaded engagement with said boss, a portion of the valve stem projecting into the interior of said cap nut, said portion of the valve stem extending only partially into the cap and having such outer dimensions relative to the interior dimensions of said cap that substantial clearance is maintained at all points between said stem and said cap, a loose connection between the cap nut and said portion of the valve stem producing longitudinal movement of the valve stem when the cap nut is turned on the boss, said connection having substantial play permitting substantial relative movement of the cap nut and the valve stem in all directions which prevents cocking and binding of the valve stem when it is so moved by the cap nut, and the cap nut and the body portion having surfaces adapted to be brought into firm contact by a forcible turning of the cap nut on said boss without a consequent increase in pressure upon said ring of resilient material.

3. A valve comprising a body portion having an externally threaded boss projecting from it and having a cylindrical cavity extending axially through the boss into the body portion, one portion of said cavity being of larger diameter than the adjacent portion, the body portion further having a pair of gas passages one of which communicates with the larger diameter portion of said cavity and the other of which communicates with the smaller diameter portion of the cavity, a valve stem guided by and movable longitudinally in the larger diameter portion of the cavity and having a part arranged to be moved into and out of the smaller diameter portion of the cavity when the valve stem is moved longitudinally, an O-ring carried by said part of the valve stem and also adapted to be moved into and out of the smaller diameter portion of the cavity when the valve stem is moved longitudinally so that when it is in the smaller diameter portion of the cavity it shuts off communication between said gas passage and when it is in the larger diameter portion of the cavity it permits gas to flow past it all around its circumference and from one gas passage to the other, an internally threaded cap nut having threaded engagement with said boss, a portion of the valve stem projecting into the interior of said cap nut, said portion of the valve stem extending only partially into the cap and having such outer dimensions relative to the interior dimensions of said cap that substantial clearance is maintained at all points between said stem and said cap, a pin carried by the cap nut and extending transversely across the space within it, said portion of the valve stem having a circular opening extending through it, the diameter of which is substantially greater than the diameter of the pin, said pin freely passing through said opening whereby turning of the cap nut on the boss moves the valve stem longitudinally in said cavity without causing it to cock and bind, the cap nut and the body portion having surfaces adapted to be brought into firm contact by a forcible turn of the cap nut on said boss without any consequent increase in pressure on said O-ring.

JOHN GILROY.

References Cited in the file of this patent

UNITED STATES PATENTS

| Number | Name | Date |
|---|---|---|
| 263,091 | Ashton | Aug. 22, 1882 |
| 854,134 | Whitaker | May 21, 1907 |
| 995,247 | Garratt | Jan. 13, 1911 |
| 1,016,306 | Vial | Feb. 6, 1912 |
| 1,779,740 | Kehl | Oct. 28, 1930 |
| 1,886,159 | Brown | Nov. 1, 1932 |
| 2,126,594 | Weatherhead | Aug. 9, 1938 |
| 2,217,835 | Corbin | Oct. 15, 1940 |
| 2,360,733 | Smith | Oct. 17, 1944 |
| 2,417,242 | Eckel | Mar. 11, 1947 |
| 2,431,437 | Van Der Werff | Nov. 25, 1947 |
| 2,525,928 | McRae | Oct. 17, 1950 |

FOREIGN PATENTS

| Number | Country | Date |
|---|---|---|
| 9,164 | Great Britain | of 1915 |
| 272,665 | Switzerland | of 1951 |